United States Patent
Lister et al.

(10) Patent No.: US 8,762,014 B2
(45) Date of Patent: Jun. 24, 2014

(54) VARIATOR CHARACTERIZATION FOR FEED FORWARD TORQUE CONTROL

(75) Inventors: Brian E. Lister, Edwards, IL (US); Chad T. Brickner, Aurora, IL (US)

(73) Assignee: Caterpillar Inc., Peoria, IL (US)

( * ) Notice: Subject to any disclaimer, the term of this patent is extended or adjusted under 35 U.S.C. 154(b) by 441 days.

(21) Appl. No.: 13/251,194

(22) Filed: Sep. 30, 2011

(65) Prior Publication Data
US 2013/0085647 A1    Apr. 4, 2013

(51) Int. Cl.
*G06F 7/00* (2006.01)
*G06F 17/00* (2006.01)
*G06F 19/00* (2011.01)

(52) U.S. Cl.
USPC .......................................................... 701/55

(58) Field of Classification Search
USPC .......................................................... 701/55
See application file for complete search history.

(56) References Cited

U.S. PATENT DOCUMENTS

| | | | |
|---|---|---|---|
| 5,782,711 A | 7/1998 | Tsutsui et al. | |
| 5,911,506 A | 6/1999 | Nakamura et al. | |
| 7,062,368 B2 | 6/2006 | Ho et al. | |
| 7,493,978 B2 | 2/2009 | Nakamura et al. | |
| 7,841,455 B2 | 11/2010 | Maki et al. | |
| 7,891,182 B2 | 2/2011 | Kelly et al. | |
| 2004/0186648 A1 | 9/2004 | Zheng et al. | |
| 2007/0101709 A1* | 5/2007 | Cronin | 60/445 |
| 2008/0139363 A1 | 6/2008 | Williams | |
| 2008/0294318 A1* | 11/2008 | Kuras et al. | 701/56 |
| 2009/0062065 A1* | 3/2009 | Field et al. | 477/37 |
| 2010/0167873 A1 | 7/2010 | Akiyama et al. | |
| 2010/0197447 A1* | 8/2010 | Donohoe et al. | 476/2 |
| 2011/0295473 A1* | 12/2011 | DeMarco et al. | 701/58 |
| 2011/0313630 A1* | 12/2011 | Stoller et al. | 701/60 |

FOREIGN PATENT DOCUMENTS

| | | |
|---|---|---|
| JP | 2003185016 | 7/2003 |
| WO | 2010/070962 A1 | 6/2010 |

* cited by examiner

*Primary Examiner* — Khoi Tran
*Assistant Examiner* — Harry Oh
(74) *Attorney, Agent, or Firm* — Leydig, Voit & Mayer; Jeff A. Greene

(57) ABSTRACT

In an embodiment, torque control operation is provided in a transmission having a variable displacement variator with a hydraulic actuator. The transmission is engaged in a neutral state such that the variator output experiences substantially zero torque, and a first hydraulic pressure sweep to the hydraulic actuator is commanded while a corresponding sweep of motor speed ratio of the variator is recorded. The transmission is engaged into a locked mode providing a fixed output speed and a second hydraulic pressure sweep to the hydraulic actuator is commanded, and a corresponding sweep of variator output torque is recorded during this sweep. A torque/pressure map is then constructed relating motor torque, motor speed ratio, and actuator pressure by scaling the sweep of motor speed ratios and the sweep of variator output torque. The resultant map is usable to provide feed forward torque control of the transmission.

20 Claims, 5 Drawing Sheets

VARIATOR CHARACTERIZATION FOR FEED FORWARD TORQUE CONTROL

TECHNICAL FIELD

This patent disclosure relates generally to transmission systems for propulsion and, more particularly to a method and system for calibrating a torque provided by such a transmission.

BACKGROUND

In the context of machines used for executing tasks and manipulating materials and objects, it is sometimes desirable to control the torque of the machine, as opposed to controlling simply the speed or position of the machine or some part thereof. However, it is traditionally difficult to control torque accurately due to a lack of adequate calibration of the power train of the machine. For example, a continuously variable transmission has many hydrostatic variator static and dynamic qualities and parameters that may affect the output characteristics for any given input. More specifically, variability in hydrostatic variator components such as valves and hydraulic pump and motor components traditionally preclude accurate torque control in the transmission. While open-loop torque control with closed-loop feedback may be used, these techniques alone are not sufficient to fully meet the need for efficient and accurate torque calibration.

It will be appreciated that this background description has been created by the inventors to aid the reader, and is not to be taken as a reference to prior art, nor as an indication that any of the indicated problems were themselves appreciated in the art. While the principles described hereinafter may in some embodiments alleviate problems inherent in other systems, the scope of the protected innovation is defined by the attached claims, and not otherwise by the ability to solve any specific problem.

SUMMARY

The described principles allow a controller to obtain the necessary static and dynamic qualities and parameters to allow accurate torque control of a continuously variable transmission. In an embodiment, a method is described for providing torque control operation in a transmission having a variable displacement variator with a hydraulic actuator for varying displacement, and having an output and an internal circuit pressure. In this method, the transmission is engaged in a neutral state such that the variator output experiences substantially zero torque, and a first hydraulic pressure sweep to the hydraulic actuator is commanded. A corresponding sweep of motor speed ratio of the variator is recorded. The transmission is engaged into a locked mode providing a fixed output speed and a second hydraulic pressure sweep to the hydraulic actuator is commanded. A corresponding sweep of variator output torque is recorded during application of the second hydraulic pressure sweep. A map is constructed relating motor torque, motor speed ratio, and hydraulic pressure to the actuator by scaling the corresponding sweep of motor speed ratios of the variator and the corresponding sweep of variator output torque.

In a further embodiment, a method of providing torque control operation in a similar transmission includes commanding a first hydraulic pressure sweep to the hydraulic actuator while imposing substantially zero torque on the variator output and recording a corresponding sweep of motor speed ratio of the variator and commanding a second hydraulic pressure sweep to the hydraulic actuator while preventing the variator output from deviating from a fixed output speed regardless of circuit pressure and recording a corresponding sweep of variator output torque. By scaling the sweep of motor speed ratios and the sweep of variator output torque, a map is constructed relating motor torque, motor speed ratio, and actuator pressure.

In a further embodiment, a controller provides torque control operation for a transmission having a variable displacement variator with a hydraulic actuator for varying displacement, and having a pump and a motor having an output, the controller includes one or more inputs to receive data corresponding to a variator motor speed, a variator circuit pressure and a pump speed, and one or more outputs to write data to memory. A processor is included for executing computer-readable instructions from a non-transitory computer-readable medium, and an included set of computer-readable instructions include instructions for commanding a first hydraulic pressure sweep to the hydraulic actuator while imposing substantially zero torque on the variator output while recording a corresponding sweep of motor speed ratio of the variator and for commanding a second hydraulic pressure sweep to the hydraulic actuator while preventing the variator output from deviating from a fixed output speed while recording a corresponding sweep of variator output torque. The instructions further include instructions for populating a map relating motor torque, motor speed ratio, and actuator pressure by scaling the recorded data.

Further and alternative aspects and features of the disclosed principles will be appreciated from the following detailed description and the accompanying drawings, of which:

DETAILED DESCRIPTION

Figure 1:
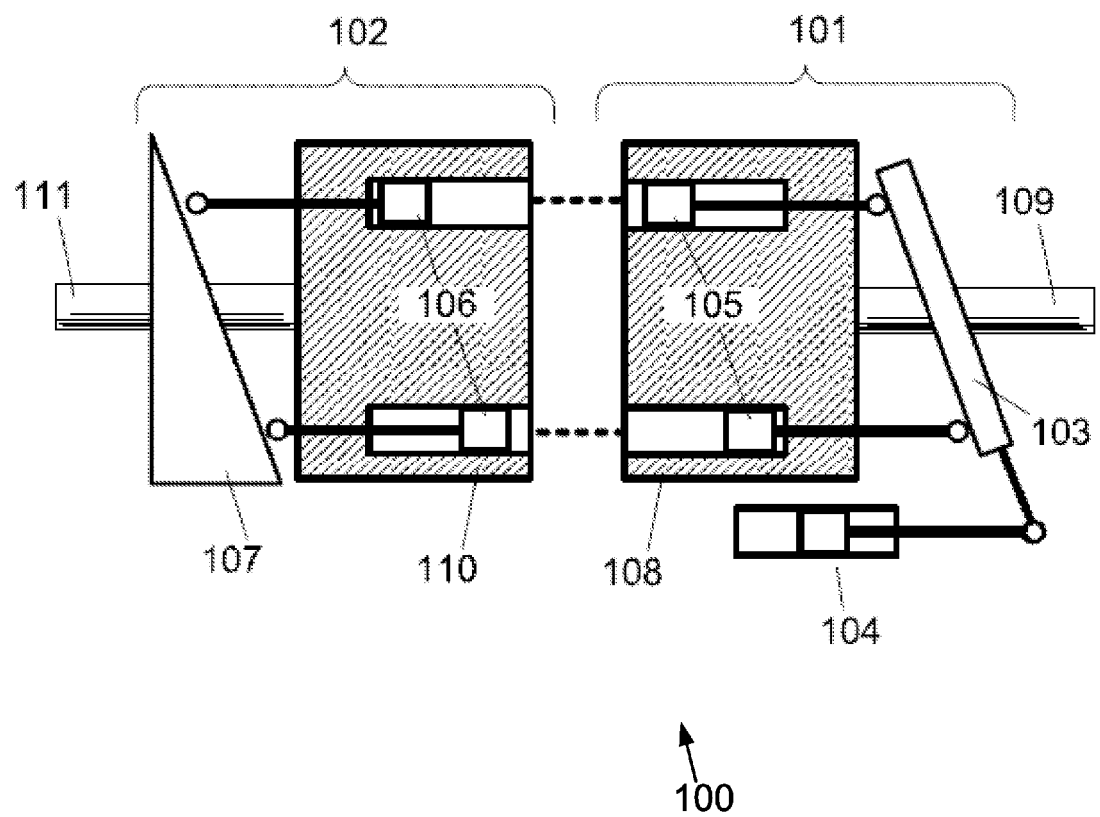
FIG. 1 is a schematic system diagram of a variator for providing a variable output torque based on an applied control pressure differential in accordance with embodiments of the disclosed principles.

This disclosure relates to machines requiring a transmission to link a power source to the final ground-engaging mechanism, e.g., wheels, tracks, etc., and/or to another powered function or implement. Examples of such machines include machines used for mining, construction, farming, transportation, or any other industry known in the art. For example, the machine may be an earth-moving machine, such as a wheel loader, excavator, dump truck, backhoe, motor grader, material handler or the like. Moreover, one or more implements may be connected to the machine for a variety of tasks, including, for example, loading, compacting, lifting, brushing, and may include, for example, buckets, compactors, forked lifting devices, brushes, grapples, cutters, shears, blades, breakers/hammers, augers, and others. In an example embodiment, the system is applied to a continuously variable transmission (CVT), such as may be used in wheel loader or motor grader machine applications.

In overview, a hydrostatic transmission with a variable displacement pump and fixed or variable displacement motor is used in combination with mechanical gearing in a transmission powered by an engine that is operated at a substantially constant speed. The hydrostatic transmission has a system pressure (circuit pressure) and a gear (or mode) that determine the transmission output torque. Thus, the driveline torque is controlled by controlling the pressure in the hydrostatic transmission. In an embodiment, the control is a combination of open loop and closed loop control as opposed to pure closed loop control, which, in the inventor's experience, may not in every case provide adequate response time.

Within the hydrostatic transmission, torque control is accomplished by controlling the swash plate angle on a variable displacement pump. In turn, the swash plate angle is controlled by a swash plate actuator. In order to provide open loop control in an accurate and effective manner within this system, a bias spring pressure in the actuator, and the correlation between the actuator position and system pressure, are determined.

In particular, in an embodiment, the machine or transmission controller determines the required differential pressure to be applied to the actuator to achieve a desired output torque by evaluating three forces acting on the variator actuator in real time. These include the actuator centering spring force, the inertia of pistons within the hydraulic pump of the variator acting on the swash plate controlled by the actuator, and the circuit pressure within the variator.

In an embodiment, these forces are evaluated and characterized by executing two sweeps of the actuator. A first sweep, termed a zero torque line, is executed by sweeping the actuator delta pressure with the transmission in a neutral state. In this state, the output of the variator is substantially unresisted, and so the variator reaction is limited only by internal inertia. A second sweep is used to produce a zero speed line. The zero speed line is obtained by sweeping the actuator with the transmission in a mechanically locked state. In an embodiment, the zero speed line is produced with the output of the transmission in a constant speed state at a nonzero speed.

With these sweeps, the accuracy of output torque relationship of the transmission are characterized to enable feedforward control. In an embodiment, the sweep data are used in conjunction with variator design information to calculate and estimate forces acting on the variator actuator. Thus, for example, a variator having high internal inertia may require a higher differential pressure to achieve the same swash plate angle compared to a variator having a lower internal inertia.

Turning to the details of the variator construction in an embodiment, FIG. 1 is a detailed schematic drawing of a variator 100 for providing a variable output torque based on an applied control pressure differential. The variator 100 comprises a pump 101 and a motor 102. The pump 101 comprises a variable angle pump swash plate 103 set by a swash plate actuator 104. A number of pump pistons 105 in respective chambers ride on the pump swash plate 103 via sliding contacts, such that the range of movement of the pump pistons 105 is set by the angle of the pump swash plate 103. The chambers for the pump pistons 105 are formed in a pump carrier 108 that is rotated via the pump input shaft 109.

The motor 102 comprises a similar arrangement including a number of motor pistons 106 in respective chambers. The motor pistons 106 of the motor 102 are slidably engaged upon a fixed motor swash plate 107. The chambers of the pump pistons 105 of the pump 101 are in fluid communication with the chambers of the motor pistons 106 of the motor 102 via hydraulic fluid that fills the chambers and intervening conduits (not shown). The chambers for the motor pistons 106 are formed in a motor carrier 110 that rotates the motor output shaft 111. As the angle of the pump swash plate 103 is varied, the amount of fluid displaced by the pump pistons 105 of the pump 101 (and thus the fluid volume received or taken from the chambers of the motor pistons 106) varies.

Because of these interrelationships, the torque and/or output speed of the motor 102 varies with the angle of pump swash plate 103. In the illustrated embodiment, the swash plate actuator 104, which in this example operates on differential hydraulic pressure, is driven via solenoid valves (not shown in FIG. 1), e.g., one for each of two pressure values, controlled electronically by appropriate input signals from a transmission controller or the like. In this way, a controller can control the output speed of the variator 100 via the application of electrical signals to solenoid valves associated with the swash plate actuator 104.

Figure 2:
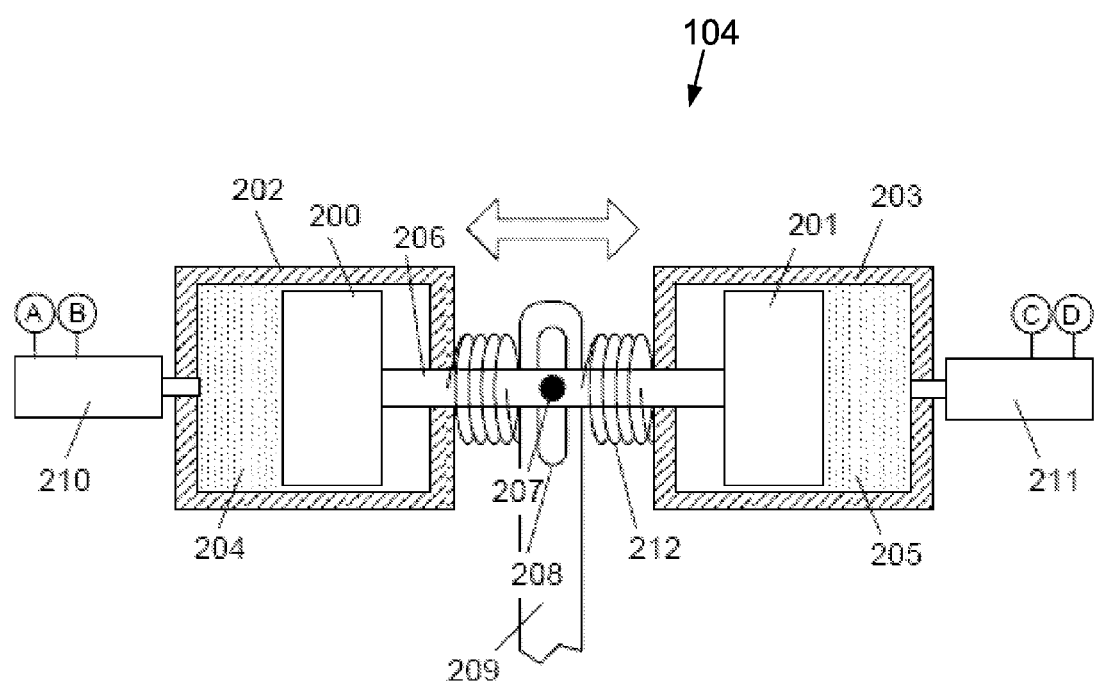
FIG. 2 is a detailed schematic drawing of a hydraulic actuator for controlling the position of a variable-angle swash plate in a variator in accordance with embodiments of the disclosed principles.

FIG. 2 is a more detailed schematic drawing of the swash plate actuator 104 for controlling the position of the variable-angle swash plate (not shown in FIG. 2) in a variator 100 such as that shown in FIG. 1. The swash plate actuator 104 includes a number of interrelated elements including primarily two opposed actuator pistons 200, 201 (or opposed chambers of a single piston) within respective cylinders 202, 203. The actuator pistons 200, 201 cooperate with the bores of their respective cylinders 202, 203 to form respective actuator piston chambers 204, 205 for containing pressurized hydraulic fluid.

The actuator pistons 200, 201 are joined by a bar 206 which has a central pivot pin 207 mounted thereon. The central pivot pin 207 interferes within a control slot 208 in a swash plate arm 209, such that the lateral position of the bar 206 establishes the position of the swash plate arm 209 and hence the angle of the swash plate itself (not shown). The bar 206 is biased to a central position by opposing springs 212. As the bar 206 is displaced from this central position, there is a restoring force exerted by springs 212 that is proportional to the displacement.

The lateral position of the bar 206 is determined by the positions of the actuator pistons 200, 201 within the cylinders 202, 203. The positions of the actuator pistons 200, 201 are determined by the difference in hydraulic pressure between the actuator piston chambers 204, 205. Respective actuator pressure valves 210, 211 independently control the pressure within actuator piston chambers 204, 205. In an example, the actuator pressure valves 210, 211 are solenoid valves that supply hydraulic fluid at a pressure that is set by an applied current within limits set by a supply pressure. Thus, in the illustrated example, each actuator pressure valve 210, 211 has at least a current input (illustrated as inputs A and C) and a fluid input (illustrated as inputs B and D). Typically, solenoid valves can supply fluid at any pressure between zero and the fluid pressure at the fluid input B, D. The pressure response of a solenoid valve such as actuator pressure valves 210, 211 to a current input is a function of various components and their tolerances.

Because the distance between the actuator pistons 200, 201 is fixed by the length of the bar 206, it is the pressure differential between actuator piston chambers 204, 205 rather than the absolute pressure within each actuator piston chamber 204, 205 that establishes the position of the bar 206. In particular, when the bar 206 is in such a position that the net displacement force differential between the actuator pistons 200, 201 is equal to the net restoring force exerted by springs 212, the system is in equilibrium.

Considering FIG. 2 in conjunction with FIG. 1, it will be appreciated that the torque supplied at output 111 is related to the pressure differential applied by actuator pressure valves 210, 211. In particular, the fluid pressure within the hydraulic circuit between pump pistons 105 and motor pistons 106 is related to the angle of pump swash plate 103, and the angle of pump swash plate 103 is related to the pressure differential applied by actuator pressure valves 210, 211. Thus, in torque-controlled applications, it is desirable to accurately correlate combinations of solenoid currents for actuator pressure valves 210, 211 (or applied pressure differential in swash plate actuator 104) with expected associated output torques at output 111.

Figure 3:
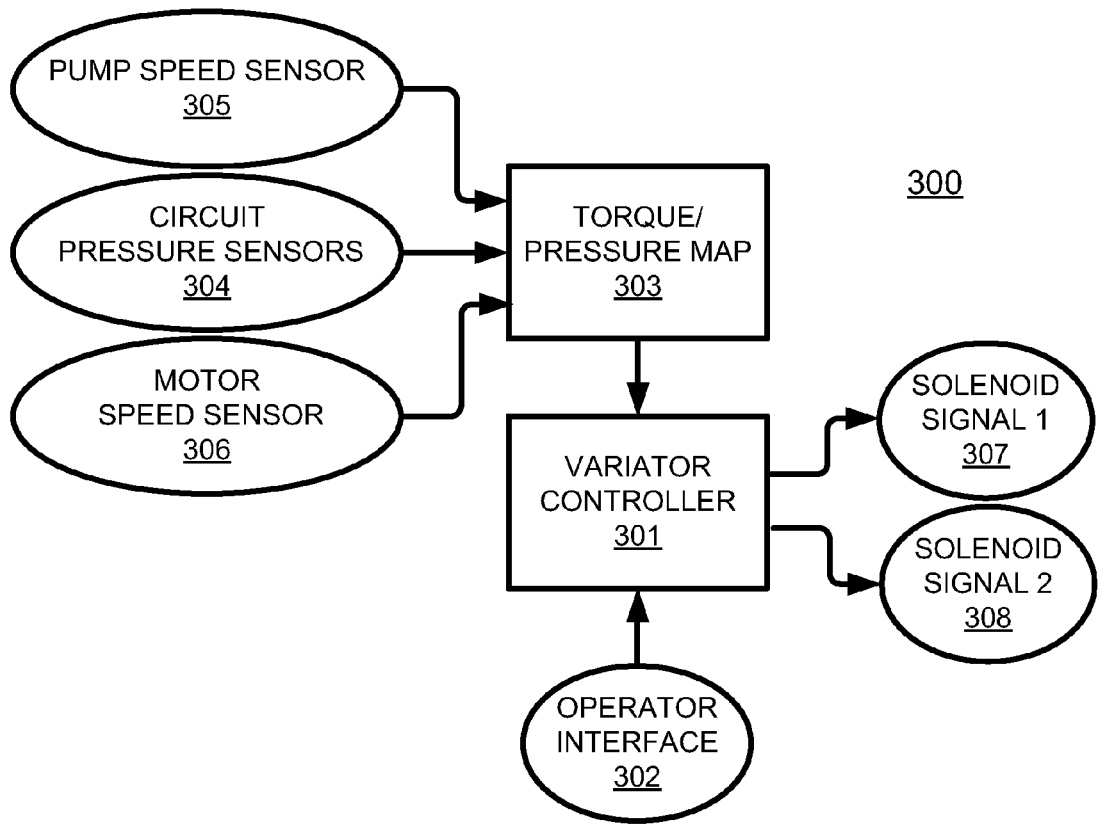
FIG. 3 is a simplified logical schematic of control components and data flow channels to calibrate and operate a variator such as that shown in FIG. 3 in accordance with embodiments of the disclosed principles.

Before discussing the calibration process in further detail, the control infrastructure and informational flow within the system will be discussed. FIG. 3 is a simplified logical schematic 300 of the control components and data flow associated with the mechanical components of FIGS. 1 and 2 to calibrate and operate the variator 100 effectively. In particular, a variator controller 301 is provided for controlling the operation of the variator 100 via actuator pressure valves 210, 211. The variator controller 301 may be a dedicated controller, but more typically will be incorporated into a controller used for control of a larger system, such as a transmission, associated with the variator 100.

The controller 301 may be of any suitable construction, however in one example it comprises a digital processor system including a microprocessor circuit having data inputs and control outputs, operating in accordance with computer-readable instructions stored on a computer-readable medium. Typically, the processor will have associated therewith long-term (non-transitory) memory for storing the program instructions, as well as short-term (volatile) memory for storing operands and results during (or resulting from) processing.

In operation, the controller 301 receives a number of data inputs from the variator 100 and provides a number of control outputs to the variator 100. In order to detect a desired torque, the controller 301 receives a data input from the operator interface 302, e.g., an accelerator or torque setting. The operator may be human or automated, and the operator interface 302 may vary accordingly. As noted above, the variator 100 operates in discrete modes, which may be automatically set and/or set based on user input.

As noted above, however, there may be a significant variation in the qualities and characteristics of a given hydrostatic transmission from what is expected due to differences in the characteristics of the solenoid valves and variations within the transmission, e.g., in fluid composition, piston tolerances and so on. Another potential source of variability lies in the port plate timing system. In particular, the port plate timing, i.e., the timing with which pressurized fluid is admitted to the motor side of the variator from the pump side of the variator, is often adjustable. While this timing may be calibrated and set, there may be either miscalibration or drift resulting in a discrepancy in the variator response.

Any or all of these sources of discrepancy can result in erroneous operation of the variator, wherein the application of parameters expected to yield a certain output torque does not in fact yield the expected torque. Thus, calibration of such a transmission is important to enable accurate open loop torque control.

To this end, in an embodiment, a calibrated actuator delta pressure and output torque relationship is stored as a map 303 that is created and stored by the variator controller 301 initially and then retrieved by the variator controller 301 during actual operation. The map 303 may include three or more dimensions. For example, the map 303 may supply a pressure value based on desired torque, engine speed, pump speed (and/or MSR) and so on.

To create the map 303, the mapping processor, which may be the controller 301 or otherwise, receives a first data input from circuit pressure sensors 304 or other torque sensing devices or sensors. Although it is possible to use a single pressure sensor, it is more desirable to use multiple sensors to obtain more accurate pressure readings.

The circuit pressure sensors 304 are positioned and adapted to sense the hydraulic pressure within the internal hydraulic circuit of the variator 100 (i.e., between pump pistons 105 and motor pistons 106) and to provide signals reflective of the sensed pressures. For example, in an embodiment, the circuit pressure sensors 304 are electrical pressure transducers that produce an electrical current or voltage proportional to the sensed pressure. It will be appreciated that any other suitable pressure sensor type may alternatively or additionally be employed.

A second data input to the controller 301 or other calibrating processor is linked to a pump speed sensor 305. The pump speed sensor 305 is positioned and adapted to detect the rotational speed of the variator input shaft 111 and to provide a signal related to the sensed rotational input speed. A motor speed sensor 306 is linked to a third data input of the controller 301 or other calibration processor. The motor speed sensor 306 is positioned and adapted to detect the rotational speed of the variator output shaft 111 and to provide a signal related to the sensed rotational output speed. The output speed may be compared to the input speed to derive the motor speed ration (MSR). It will be appreciated that the pump displacement (e.g., derived from the stroke of swash plate actuator 104) or the angle of the pump swash plate 103 (e.g., derived from an angle sensor) can be used as an input in place of the motor speed ratio.

Based on the various available inputs as discussed above, the controller 301 identifies the appropriate control values in the map 303 and outputs corresponding control signals such that the variator 100 provides an output torque closely corresponding to the desired output torque. In particular, in an embodiment, the controller 301 provides two solenoid control signals 307, 308 to control the operation of the swash plate actuator 104 and thus the operation of the variator 100. The solenoid control signals 307, 308 include a first solenoid control signal 307 to control a first one of the actuator pressure valves 210 and a second solenoid control signal 308 to control a second one of the actuator pressure valves 211.

Figure 4:
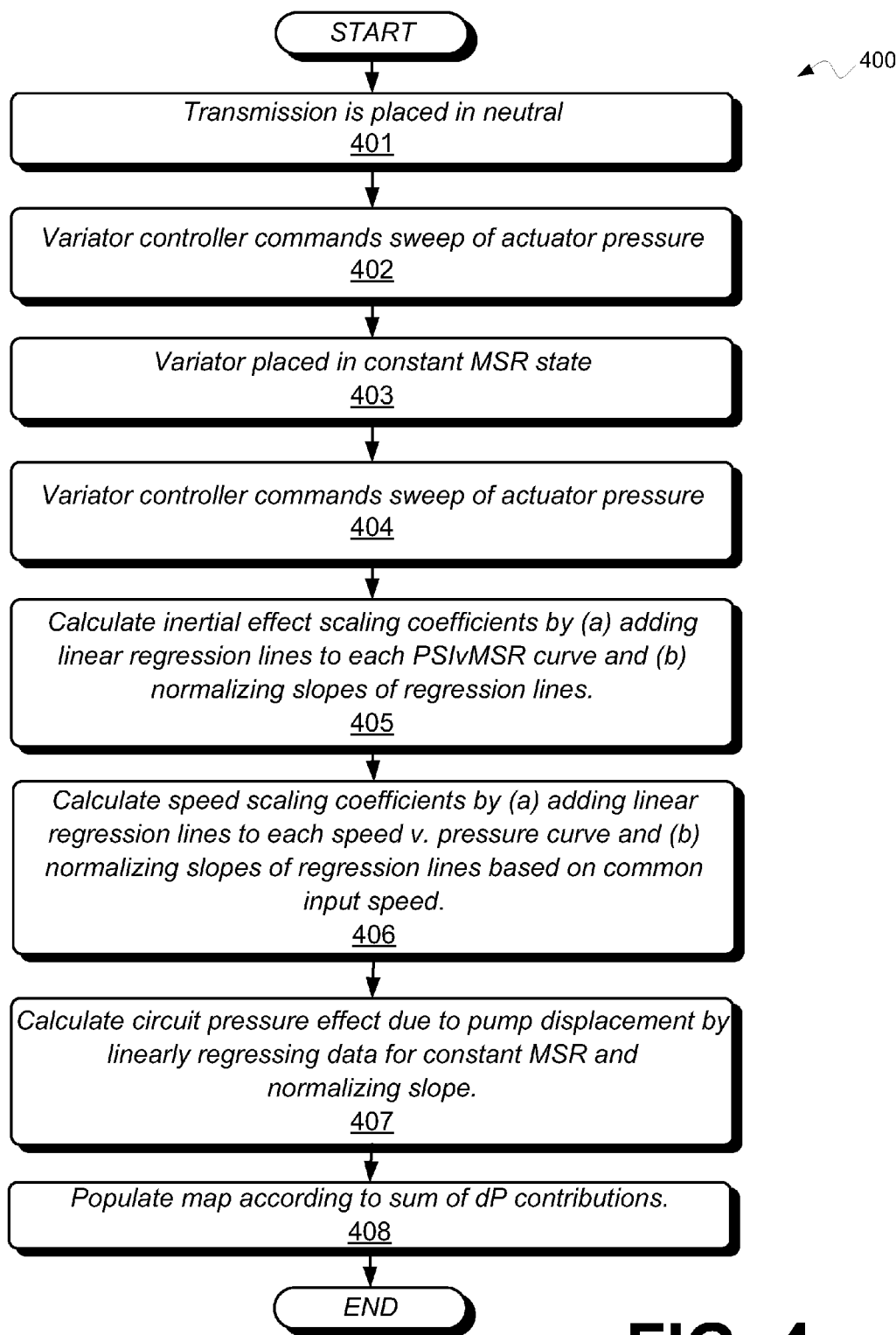
FIG. 4 is a flow chart illustrating a process for characterizing a hydrostatic transmission in accordance with embodiments of the disclosed principles.

In an embodiment, a continuously variable split torque transmission having a hydraulic pump/motor variator as discussed above is calibrated by the process 400 described in the flow chart of FIG. 4. This process 400 develops an actuator pressure-to-output torque map, e.g., map 303 discussed above, to enable and improve the accuracy of feed forward control. In overview, the process 400 functions by obtaining variator test data and combining this data with system design information to derive a best estimate of the effects of forces acting on the actuator in real time, e.g., spring force, inertial forces, and forces due to circuit pressure. These effects, once quantified and combined with system design information, are then employed to determine an appropriate actuator control pressure differential for each potentially desirable output torque.

As will be described in greater detail, the force effects of interest are determined from a two-sweep-regimen, to produce two nominal characterization lines. These nominal characterization lines are then scaled via system design information to fully populate the map. The first sweep is an unloaded sweep, with zero applied output torque, while the second sweep is a loaded sweep wherein the transmission is locked to zero speed, and the variator output is locked at some non-zero speed (fixed by the mechanical configuration).

Figure 5:
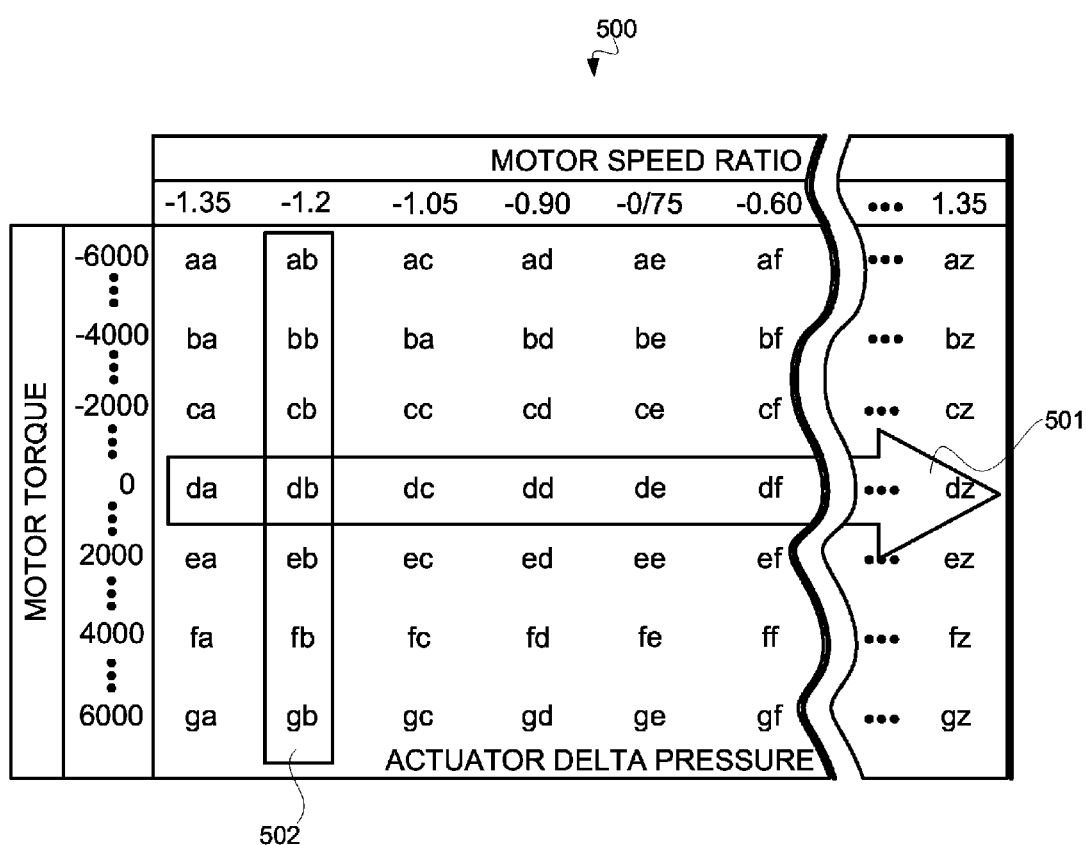
FIG. 5 is a diagram showing a mapping relating motor torque, MSR, and actuator delta pressure, created in accordance with embodiments of the described principles.

Turning to the specific steps of process 400 in an exemplary embodiment, at stage 401 of the process 400, the transmission is placed in neutral. This may be executed by the variator controller 301 or by a separate transmission controller. In this state, the variator MSR may be varied without external load. With the transmission in neutral, the variator controller 301 commands a sweep of hydraulic pressure to the variator actuator at stage 402, with the hydraulic pressure being varied between predetermined limits, e.g., maximum and minimum supply pressures or lesser pressures if desired. As the pressure to the actuator is swept, the corresponding MSR of the variator is recorded as shown in speed sweep row 501 of torque table 500 (FIG. 5). It will be appreciated that the torque table 500 has been substantially abbreviated for the sake of clarity and illustration, as represented by the ellipses in the figure. At any rate, the precise quantity and arrangement of data in any implementation is a matter of system capability and design preference, and is not critical to the operation of the described principles.

At stage 403, the mechanical portion of the transmission is locked by the controller, placing the variator in a constant MSR state. In the illustrated example, the MSR during this sweep is −1.2 due to the physical setup in the example, but other transmissions may exhibit other MSRs in this state. The exact value of the MSR is not important as long as it is maintained constant during the sweep so that output torque may be developed. At stage 404, with the transmission locked, the actuator pressure values are again swept, and the resultant variator output torque is captured, as in torque sweep column 502 of torque table 500 (FIG. 5).

At this point, the resultant data can be scaled to populate the remainder of the torque table 500. In particular, since the applied delta pressure and actuator spring constant is known (we will treat the combined spring forces as a single spring), the spring force may be subtracted from the data to yield the result of the inertial forces, e.g., due to the pistons acting on eth swash plate. With the spring contribution removed, the remaining inertial effects are simply a set of curves rotated about the origin by appropriate scaling coefficients.

The inertial effect scaling coefficients are calculated in stage 405 by (a) adding linear regression lines to each PSIvMSR curve (actuator delta pressure versus motor speed ratio) for negative and positive motor speed ratios, and (b) normalizing the slopes of the regression lines based on a common input speed. The resultant slope values are the inertial effect scaling coefficients.

Speed scaling coefficients are calculated at stage 406 by (a) adding linear regression lines to each speed versus circuit pressure curve for negative and positive circuit pressures, and (b) normalizing the slopes of the regression lines based on a common input speed. The resultant slope values are the speed scaling coefficients.

At stage 407, the circuit pressure effect due to pump displacement is calculated by linearly regressing data for constant MSR and normalizing the slope via the zero speed shift point used for the fixed speed sweep. The resulting slopes are the MSR scaling coefficients.

With the foregoing coefficients calculated, the map 500 can be fully populated. In an embodiment, the relationship between circuit pressure and actuator delta pressure is—(Inertial dP+Circuit pressure dP)+Spring dP=Actuator dP Command. In this relationship, the shorthand "dP" refers to "delta pressure," Inertial dP denotes the delta pressure contribution due to variator piston inertia and any other inherent inertial forces, Circuit pressure dP denotes the delta pressure contribution due to variator circuit pressure, and Spring dP denotes the delta pressure contribution due to the actuator spring.

Thus, for a given desired torque, corresponding to a given desired circuit pressure, the required actuator delta Pressure (dP) command can be derived from the foregoing relationship. In this way, the map 500 is populated at stage 408 and the resultant map 500 stored in a computer readable memory associated with or accessible to the controller 301.

Subsequently during actual operation, the controller is able to access the map 500 (303) to derive an appropriate actuator pressure as needed. While the system as described allows for accurate feed forward control of torque via actuator dP, the map 500 (303) may also be used with some degree of feedback and/or may be subsequently modified for more accurate calibration if an error or inaccuracy is detected during operation.

In an embodiment, the locked condition for the second sweep may be created by intentionally creating a clutch tie-up at a transmission synchronous point. In other words, in a two-clutch system, when the synchronous point is reached, instead of deactivating an off-going clutch and activating an oncoming clutch, both clutches are activated. It will be appreciated that such synchronous points occur at zero output speed as well as certain other non-zero output speeds. Whichever synchronous point is selected, the clutch tie-up will prevent the output speed from changing from the output speed associated with that synchronous point. At that point then, the circuit pressure may be increased and decreased without resulting in a change in output speed, thus allowing circuit pressure to be built.

Industrial Applicability

The described principles are applicable to machines requiring a transmission to link a power source to the final ground-engaging mechanism, e.g., wheels, tracks, etc., and/or to another powered function or implement. Examples of such machines include machines used for mining, construction, farming, transportation, or any other industry known in the art. For example, the machine may be an earth-moving machine, such as a wheel loader, excavator, dump truck, backhoe, motor grader, material handler or the like. Exemplary implements include, without limitation, buckets, compactors, forked lifting devices, brushes, grapples, cutters, shears, blades, breakers/hammers, augers, and others.

Within such applications, the described principles apply to the operation of hydrostatic and hydraulic continuously variable transmissions to allow accurate torque control using a feed forward control configuration. This allows the operation of the host machine to be controlled in a more effective manner than simple traditional speed control or other alternative control strategies.

It will be appreciated that the foregoing description provides useful examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. For example, the sweeps shown in the illustrated calibration steps may optionally be executed in reverse order, and other alternative orders and steps may be practicable where logically appropriate without departing from the described principles.

We claim:

1. A method of providing torque control operation in a transmission having a variable displacement variator having a hydraulic actuator for varying displacement and having an output, the variator further having an internal circuit pressure, the method comprising:
a controller engaging the transmission in a neutral state such that the variator output experiences substantially zero torque;
with the transmission in the neutral state, commanding a first hydraulic pressure sweep to the hydraulic actuator wherein the first commanded hydraulic pressure sweep encompasses a first predetermined pressure range, and recording a first corresponding sweep of motor speed ratio of the variator during application of the first hydraulic pressure sweep;
engaging the transmission into a locked mode wherein the variator output provides a fixed output speed regardless of circuit pressure;
with the transmission in the locked mode, commanding a second hydraulic pressure sweep to the hydraulic actuator, wherein the second hydraulic pressure sweep encompasses a second predetermined pressure range, and recording a second corresponding sweep of variator output torque during application of the second hydraulic pressure sweep; and
constructing a map relating motor torque, motor speed ratio, and hydraulic pressure to the hydraulic actuator by scaling the first corresponding sweep of motor speed ratios of the variator during application of the first hydraulic pressure sweep and scaling the second corresponding sweep of variator output torque during application of the second hydraulic pressure sweep.

2. The method of providing torque control operation in a transmission having a variable displacement variator according to claim 1, further comprising using the map to control the transmission via feed forward torque control.

3. The method of providing torque control operation in a transmission having a variable displacement variator according to claim 2, further comprising determining an error in the map while using the map to control the transmission via feed forward torque control and modifying the map to correct the error.

4. The method of providing torque control operation in a transmission having a variable displacement variator according to claim 1, wherein the first hydraulic pressure sweep and the second hydraulic pressure sweep encompass the same actuator pressure range.

5. The method of providing torque control operation in a transmission having a variable displacement variator according to claim 1, wherein the actuator pressure ranges encompassed within the first hydraulic pressure sweep and the second hydraulic pressure sweep are pressure differentials.

6. The method of providing torque control operation in a transmission having a variable displacement variator according to claim 1, wherein the steps of commanding hydraulic pressure to the variator actuator are executed via commands sent to one or more hydraulic valves.

7. The method of providing torque control operation in a transmission having a variable displacement variator according to claim 1, wherein engaging the transmission into a mode wherein the variator provides a fixed output speed regardless of circuit pressure includes creating a clutch tie-up.

8. The method of providing torque control operation in a transmission having a variable displacement variator according to claim 1, wherein scaling the first corresponding sweep of motor speed ratios of the variator during application of the first hydraulic pressure sweep comprises deriving inertial effect scaling coefficients by linearly regressing the first corresponding sweep of motor speed ratio of the variator during application of the first hydraulic pressure sweep for negative and positive motor speed ratios and normalizing slopes of the regressions based on a common input speed.

9. The method of providing torque control operation in a transmission having a variable displacement variator according to claim 1, wherein scaling the second corresponding sweep of variator output torque during application of the second hydraulic pressure sweep comprises deriving motor speed ratio scaling coefficients by linearly regressing the second corresponding sweep of variator output torque during application of the second hydraulic pressure sweep and normalizing the slope via a zero speed shift point.

10. The method of providing torque control operation in a transmission having a variable displacement variator according to claim 1, wherein the fixed output speed is a zero speed.

11. The method of providing torque control operation in a transmission having a variable displacement variator according to claim 1, wherein the hydraulic actuator varies the variator displacement via a variable-angle swash plate.

12. A method of providing torque control operation in a transmission having a variable displacement variator having a hydraulic actuator for varying displacement, and having an output, the variator further having an internal circuit pressure, the method comprising:
commanding a first hydraulic pressure sweep to the hydraulic actuator while imposing substantially zero torque on the variator output and recording a first corresponding sweep of motor speed ratio of the variator during application of the first hydraulic pressure sweep;
commanding a second hydraulic pressure sweep to the hydraulic actuator while preventing the variator output from deviating from a fixed output speed regardless of circuit pressure and recording a second corresponding sweep of variator output torque during application of the second hydraulic pressure sweep; and
a controller constructing a map relating motor torque, motor speed ratio, and actuator pressure by scaling the first corresponding sweep of motor speed ratios and the second corresponding sweep of variator output torque.

13. The method of providing torque control operation in a transmission having a variable displacement variator according to claim 12, further comprising using the map to control the transmission via feed forward torque control.

14. The method of providing torque control operation in a transmission having a variable displacement variator according to claim 13, further comprising determining an error in the map while using the map to control the transmission via feed forward torque control and modifying the map to correct the error.

15. The method of providing torque control operation in a transmission having a variable displacement variator according to claim 12, wherein the first hydraulic pressure sweep and the second hydraulic pressure sweep encompass the same actuator pressure values.

16. The method of providing torque control operation in a transmission having a variable displacement variator according to claim 12, wherein each of the actuator pressure values encompassed within the first hydraulic pressure sweep and the second hydraulic pressure sweep is a pressure differential.

17. The method of providing torque control operation in a transmission having a variable displacement variator according to claim 12, wherein the steps of commanding hydraulic pressure to the variator actuator are executed via commands sent to one or more hydraulic valves associated with the actuator.

18. The method of providing torque control operation in a transmission having a variable displacement variator according to claim 12, wherein preventing the variator output from deviating from a fixed output speed regardless of circuit pressure includes creating a clutch tie-up.

19. The method of providing torque control operation in a transmission having a variable displacement variator according to claim 12, wherein the hydraulic actuator varies the variator displacement via a variable-angle swash plate.

20. A controller for providing torque control operation for a transmission having a variable displacement variator with a hydraulic actuator for varying displacement, and having a pump and a motor having an output, the controller comprising:

one or more inputs to receive data corresponding to a variator motor speed, a variator circuit pressure and a pump speed;

one or more outputs to write data to memory;

a processor for executing computer-readable instructions from a non-transitory computer-readable medium; and a set of computer-readable instructions stored on the non-transitory computer-readable medium, the instructions including instructions for commanding a first hydraulic pressure sweep to the hydraulic actuator while imposing substantially zero torque on the variator output while recording a first corresponding sweep of motor speed ratio of the variator and for commanding a second hydraulic pressure sweep to the hydraulic actuator while preventing the variator output from deviating from a fixed output speed while recording a second corresponding sweep of variator output torque, and populating a map relating motor torque, motor speed ratio, and actuator pressure by scaling the recorded data.

* * * * *

UNITED STATES PATENT AND TRADEMARK OFFICE
CERTIFICATE OF CORRECTION

| | | |
|---|---|---|
| PATENT NO. | : 8,762,014 B2 | |
| APPLICATION NO. | : 13/251194 | |
| DATED | : June 24, 2014 | |
| INVENTOR(S) | : Lister et al. | |

It is certified that error appears in the above-identified patent and that said Letters Patent is hereby corrected as shown below:

In the Specification

Column 1, line 17, delete "thereof" and insert -- thereof. --.

Column 8, line 36, delete "Industrial Applicability" and insert -- INDUSTRIAL APPLICABILITY --.

Signed and Sealed this
Fifteenth Day of September, 2015

Michelle K. Lee
*Director of the United States Patent and Trademark Office*